(12) United States Patent
Pavallier et al.

(10) Patent No.: US 12,228,172 B2
(45) Date of Patent: Feb. 18, 2025

(54) GUIDE DEVICE AND MECHANICAL SYSTEM COMPRISING SUCH A DEVICE

(71) Applicant: HYDROMECANIQUE ET FROTTEMENT, Andrezieux-Boutheon (FR)

(72) Inventors: Pierrick Pavallier, Perreux (FR); Fabrice Prost, Saint-Etienne (FR)

(73) Assignee: HYDROMECANIQUE ET FROTTEMENT, Andrezieux-Boutheon (FR)

( * ) Notice: Subject to any disclaimer, the term of this patent is extended or adjusted under 35 U.S.C. 154(b) by 126 days.

(21) Appl. No.: 18/008,329

(22) PCT Filed: May 28, 2021

(86) PCT No.: PCT/FR2021/050969
§ 371 (c)(1),
(2) Date: Dec. 5, 2022

(87) PCT Pub. No.: WO2022/003264
PCT Pub. Date: Jan. 6, 2022

(65) Prior Publication Data
US 2023/0204067 A1     Jun. 29, 2023

(30) Foreign Application Priority Data
Jun. 30, 2020   (FR) ........................................ 2006880

(51) Int. Cl.
*F16C 17/24*     (2006.01)
*F16C 17/02*     (2006.01)

(52) U.S. Cl.
CPC ............ *F16C 17/246* (2013.01); *F16C 17/02* (2013.01); *F16C 2233/00* (2013.01)

(58) Field of Classification Search
CPC ...... F16C 17/02; F16C 17/246; F16C 33/102; F16C 33/1065; F16C 2233/00
See application file for complete search history.

(56) References Cited

U.S. PATENT DOCUMENTS

| | | | | |
|---|---|---|---|---|
| 6,868,711 | B2 * | 3/2005 | Ebi ........................ | G01N 19/02 73/7 |
| 2004/0042698 | A1 * | 3/2004 | Yamamoto .......... | F16C 33/1025 384/291 |
| 2007/0163325 | A1 * | 7/2007 | Radzisewski ............ | G01N 3/56 73/7 |

(Continued)

FOREIGN PATENT DOCUMENTS

| | | | |
|---|---|---|---|
| EP | 3045749 A1 | 7/2016 | |
| WO | WO-2019034484 A1 * | 2/2019 | ............ F16C 17/022 |

*Primary Examiner* — Alan B Waits
(74) *Attorney, Agent, or Firm* — FORGE IP, PLLC

(57) ABSTRACT

A guide device includes: a metal component in the form of a bush provided with a friction surface intended to receive a mating part in frictional contact by sliding with oscillation; a wear sensing system of the friction surface having one or more sensors; and a wireless communication system connected to the detection system and configured to transmit information relating to the wear of the friction surface out of the guide device. The sensor or sensors are arranged exclusively on one longitudinal side or on two longitudinal sides of the bush, each longitudinal side being defined over at most two fifths of the length of the annular bush.

18 Claims, 3 Drawing Sheets

(56) References Cited

U.S. PATENT DOCUMENTS

| | | | | |
|---|---|---|---|---|
| 2008/0152271 A1* | 6/2008 | Barlerin | ............... | F16C 23/045 |
| | | | | 384/322 |
| 2015/0307801 A1* | 10/2015 | Villemagne | ............. | F16C 33/20 |
| | | | | 508/108 |
| 2016/0208849 A1* | 7/2016 | Gorges | ................. | F16C 33/208 |
| 2017/0122366 A1* | 5/2017 | Kuhlmann | ............... | G01N 3/56 |
| 2021/0349046 A1* | 11/2021 | Haschke | ................ | F16C 13/04 |

* cited by examiner

GUIDE DEVICE AND MECHANICAL SYSTEM COMPRISING SUCH A DEVICE

TECHNICAL FIELD

The present invention relates to a guide device comprising a metal component, a detection device and a wireless communication device. The field of the invention is that of devices for guiding moving parts in sliding friction contact.

PRIOR ART

The guide devices according to the invention are, for example, of the bush type for guiding an axle forming the articulation of construction machinery.

Devices mounted on machines are subjected to high mechanical stresses. Preventative and predictive maintenance solutions are put in place in order to avoid costly downtime.

DISCLOSURE OF THE INVENTION

The aim of the present invention is to propose a guide device which makes it possible to carry out predictive maintenance operations.

To this end, the subject matter of the invention concerns a guide device comprising:
  a metal component in the form of a bush provided with a friction surface intended to receive a mating part in frictional contact by sliding with oscillation;
  a sensing system of the wear of the friction surface comprising one or more sensors;
  a wireless communication system connected to the sensing system and configured to transmit information relating to wear of the friction surface out of the guide device;
  characterized in that the sensor or sensors are disposed exclusively on one or two longitudinal sides of the bush, each longitudinal side being defined over at most two fifths of the length of the annular bush.

Thus, the invention enables the device to communicate the level of wear or clearance of the friction component, in order to replace it before a critical malfunction. When the device is in operation, the mechanical stresses are generally concentrated on the sides of the bush. Disposing the sensors on a side rather than in the central portion makes it possible to improve the detection of wear and the chances of carrying out a predictive maintenance operation before the system suffers a critical malfunction.

According to other advantageous characteristics of the invention, taken individually or in combination:
  Each longitudinal side is defined over a third of the length of the annular bush.
  The sensor or sensors are disposed exclusively on one longitudinal side of the bush.
  The sensor or sensors are distributed over the two longitudinal sides of the bush.
  The metal component is formed by an annular bush having a radial thickness of at least 5 millimeters.
  The metal component is formed by an annular bush having a radial thickness of at most 15 millimeters.
  The guide device comprises a lubricant disposed on the friction surface.
  The friction surface comprises fixtures acting as a reservoir for lubricant.
  The fixtures comprise cavities.
  The fixtures comprise grooves.
  The detection system is configured for the detection of wear of the friction surface at least over an angular range of 3° about a central axis of the metal component.
  The detection system is configured for 360° detection of wear about the central axis. In this case, the operator carrying out mounting of the guide device and of its counterpart does not need to ensure that the detection system is correctly orientated. In fact, the zone of maximum load necessarily lies within the angular detection range. Assembly of the device is therefore simplified.
  The detection system comprises a plurality of sensors which are distributed about the central axis and which ensure the detection of wear over at least an angular range of 120°.
  The sensors ensure the detection of wear over a plurality of angular ranges.
  The sensors are distributed over 360° about the central axis.
  The detection system comprises three sensors distributed over 120° about the central axis.
  The detection system comprises four sensors distributed over 90° about the central axis.
  The detection system is configured for the detection of wear over a single angular range of at least 3°, i.e. in a single angular direction. In this case, the operator mounting the guide device and its counterpart must ensure that the detection system is correctly oriented, with the angular range of detection coinciding with the maximum load zone. The device is simpler and less costly, but its assembly requires more precision.
  The detection system is configured for the detection of wear over at least an angular range of 60°, preferably at least 120°. This provides a good compromise between the cost of the device, the accuracy of detection and the accuracy of assembly.
  The detection system comprises a single sensor, which ensures the detection of wear of the friction surface over at least an angular range of 3°.
  The detection system comprises a plurality of sensors ensuring the detection of wear over at least an angular range of 60°. The sensors may be disposed in this single angular range of 60°, or over a more restricted range.
  The or each sensor comprises at least one conductive wire having one end disposed at a given depth below the friction surface.
  The detection system is configured to detect different wear thresholds of the friction surface.
  The or each sensor comprises several conductive wires having ends disposed at different depths below the friction surface.
  Each sensor comprises means for indexing its angular position about the central axis.
  Each sensor comprises means for indexing its axial position along the friction surface.
  Each sensor comprises means for indexing its radial position with respect to the friction surface.
  The or each sensor comprises a cylindrical envelope housed in an orifice passing through the metal component between the friction surface and an opposing surface.
  The radial indexing means comprise a collar formed on the cylindrical envelope of the sensor.
  The detection system comprises a conductive strip which on the one hand is disposed in an annular groove formed on a surface of the metal component opposite to the friction surface and which on the other hand is connected to each sensor and to the wireless communication system.

The communication system includes a transmitter configured to transmit information through metal components having a total thickness more than 10 millimeters.

The subject matter of the invention also concerns a mechanical system, characterized in that it comprises at least one guide device as described above, and a mating part mounted in sliding frictional contact with the friction surface, preferably sliding friction with oscillation.

DESCRIPTION OF THE FIGURES

The invention will be better understood from the following description which is given solely by way of non-limiting example and is made with reference to the appended drawings, wherein.

DETAILED DESCRIPTION OF THE INVENTION

Figure 1:
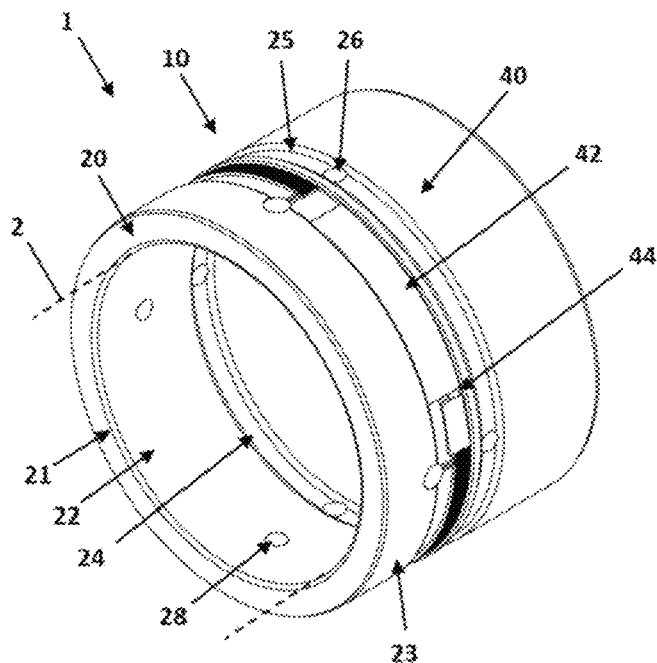
FIG. 1 is a perspective view of a mechanical system in accordance with the invention, comprising a guide device and an axle mounted in the device.
Figure 2:
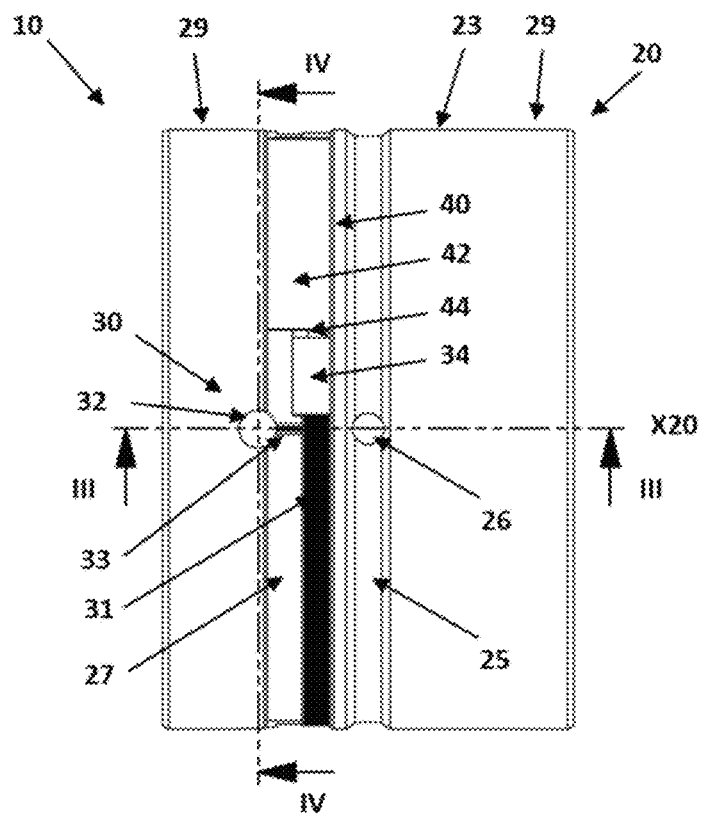
FIG. 2 is a side view of the device in a radial direction.
Figure 3:
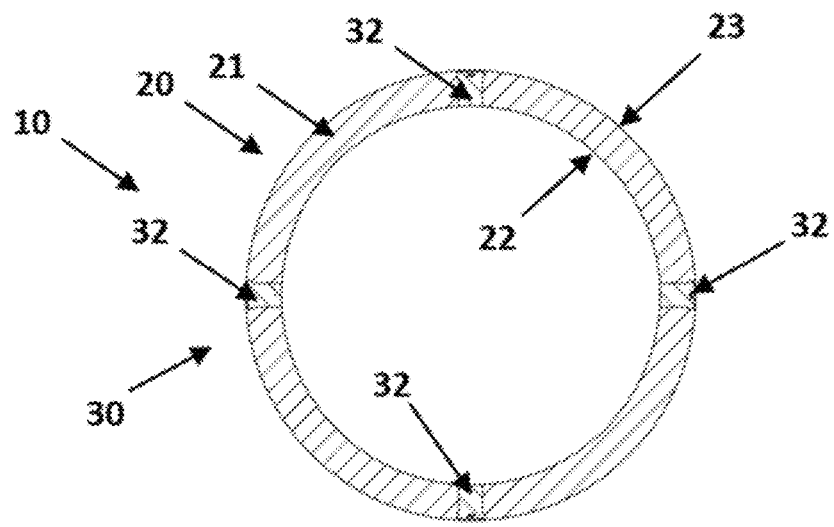
FIG. 3 is a section along the line III-III in FIG. 2.
Figure 4:
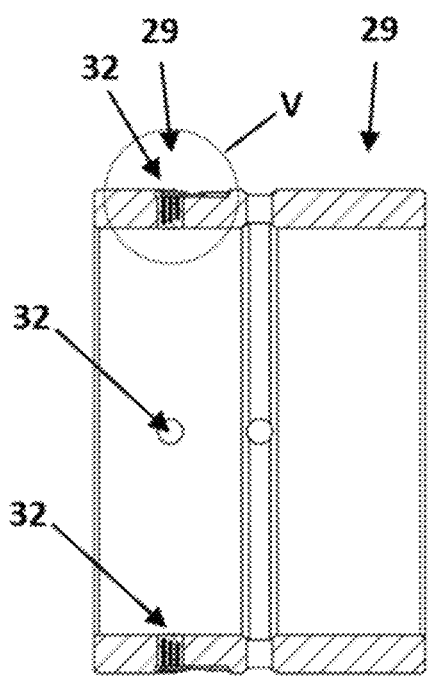
FIG. 4 is a section along the line IV-IV in FIG. 2.
Figure 5:
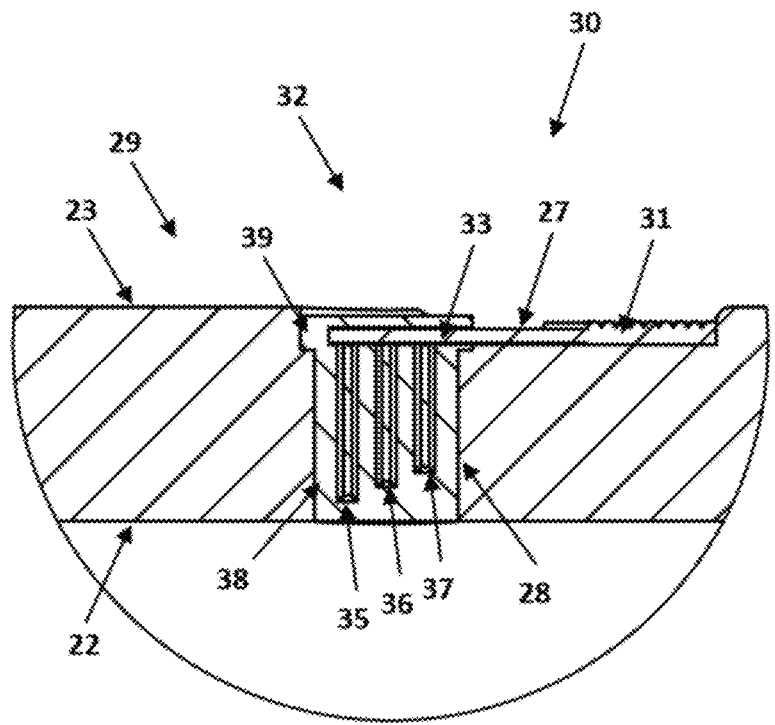
FIG. 5 is a larger scale view of detail V in FIG. 4.

FIGS. 1 and 5 show a mechanical system (1) in accordance with the invention, comprising a guide ring (10) in accordance with the invention, and an axle (2) mounted in the device (10). For the purposes of simplification, the axle (2) is represented by two dashed lines. The device (10) is designed to guide the axle (2) in sliding frictional contact, in particular in sliding with oscillation.

The oscillatory movement corresponds to an incomplete rotation, backwards and forwards, about the central axis. Either the axle (2) oscillates in the device (10), or the device (10) oscillates about the axle (2). In both cases, the loads exerted on the device (10) define a zone of maximum load, corresponding to a particular angular position.

A lubricant, preferably grease, is disposed at the frictional interface between the device (10) and the axle (2).

The device (10) comprises a metal friction component (20), a detection system (30), and a wireless communication system (40).

The metal component (20) is formed by an annular bush (21) provided with an inner surface (22) and an outer surface (23) with cylindrical profiles. The inner surface (22) constitutes a friction surface intended to receive the axle (2) in sliding frictional contact. Advantageously, the surface (22) may comprise fixtures acting as a reservoir for lubricant. The fixtures may comprise cavities, grooves and/or other types of fixtures.

The surfaces (22, 23) comprise annular grooves (24, 25) in the central portion, connected via orifices (26) passing through the bush (21). The elements (24, 25, 26) constitute means for lubricating the surface (22). In a variation, for example in the case of lubrication by the axle or by the side, the bush (21) may be devoid of elements (24, 25, 26). The means for lubricating the surface (22) may be of any type adapted to the intended application.

The surface (23) comprising an annular groove (27) formed on one side of the groove (25). The surfaces (22, 23) are connected via orifices (28) passing through the bush (21) at the border of the groove (27). The elements (27, 28) constitute means for receiving the detection system (30). In a variation, if the bush (21) is devoid of elements (24, 25, 26), the elements (27, 28) may be disposed centrally. In accordance with a further variation, the groove (27) may be disposed in the central portion, while the orifices (28) are disposed on a side (29).

In the longitudinal direction of the bush (21), a central portion and two longitudinal sides (29) surrounding the central portion can be distinguished. Each longitudinal side (29) is defined over at most two fifths of the length of the bush (21). Preferably, each longitudinal side (29) is defined over a third of the length of the bush (21).

The thickness of the bush (21) depends on the envisaged application. The bush (21) may have a thickness in the range 5 to 15 millimeters, or more. This thickness is defined over the functional range of the friction surface (22), excluding any shoulder formed on a side (29).

The detection system (30) is configured in order to detect wear of the friction surface (22). As an alternative, the detection system (30) could be configured in order to detect the clearance between the friction surface (22) and the surface of the axle (2).

The detection system (30) includes a conductive strip (31), a plurality of sensors (32) connected to the strip (31) via conductive wires (33), and a connector (34) adapted to connect the system (30) to the system (40). The strip (31) is constituted by a layer of conducting wires incorporating the wires (33). The connector (34) may include an electronic chip configured to transform information concerning power loss into wear depth information. As an alternative, the connector (34) may comprise simple wires belonging to the strip (31).

The conductive strip (31) is disposed in the annular groove (27) formed on the outer surface (23) of the metal component (20). The conductive strip (31) is on the one hand connected to each sensor (32) via the conductive wires (33) and on the other hand to the wireless communication system (40) via the connector (34).

In the example of the figures, the detection system (30) comprises four sensors (32) distributed over 90° about the central axis (X20) of the component (20). Thus, the detection system (30) ensures the detection of wear over an angular range of 360° about the central axis (X20).

According to the invention, advantageously, the sensors (32) are disposed exclusively on a longitudinal side (29) of the bush (21), without jutting out over the central portion. In fact, when the mechanical system (1) is in operation, the mechanical stresses are generally concentrated on the sides (29) of the bush (21). Disposing the sensors (32) on a side (29) rather than in the central portion makes it possible to improve the detection of wear and the chances of carrying out a predictive maintenance operation before the system (1) suffers a critical malfunction.

Each sensor (32) comprises a plurality of conductive wires (35, 36, 37), each having one end disposed at a given depth below the friction surface (22). The wear of the conductive wire (35, 36, 37) is a function of the wear of the surface (22). The ends of the conductive wires (35, 36, 37) are disposed at different depths below the friction surface (22). The successive wear of the conductive wires (35, 36, 37) is linked to the progressive wear of the friction surface (22), in accordance with different thresholds. Thus, the detection system (30) is configured to detect different wear thresholds of the friction surface (22).

Each sensor (32) comprises a cylindrical envelope (38) housed in an orifice (28) passing through the metal component (20) between the friction surface (22) and the outer surface (23). This envelope (38) constitutes a means for indexing the angular and axial position of the sensor (32). Other solutions for forming angular and/or axial indexing means may be envisaged. The envelope (38) housed in an orifice (28) has the advantage of being a simple solution to implement.

Preferably, each sensor (32) comprises means for indexing its radial position with respect to the friction surface (22). As an example, the radial indexing means may comprise a collar (39) formed on the cylindrical envelope (38) of the sensor (32). Other solutions for forming the radial indexing means may be envisaged, which make it possible to ensure that the wires (35, 36, 37) are positioned at the right depth with respect to the surface (22).

The wireless communication system (40) is connected to the sensing system (30) and configured for transmitting information relating to wear or clearance out of the guide device (10).

The system (40) comprises a transmitter (42) which sends radio signals in all directions. If the device (40) is disposed in a closed environment, the transmitter (42) may be configured in order to transmit information through metal components having a total thickness of more than 10 millimeters. In practice, the signals can be transmitted in an axial direction to an external reader disposed in the vicinity of the bush (21), through the parts of its environment.

In accordance with a particular embodiment, the transmitter (42) may be constituted by an RFID chip. Other technologies may be employed without departing from the scope of the invention.

In addition, the communication system (40) may include an energy source for powering the detection system (30).

Figure 6:
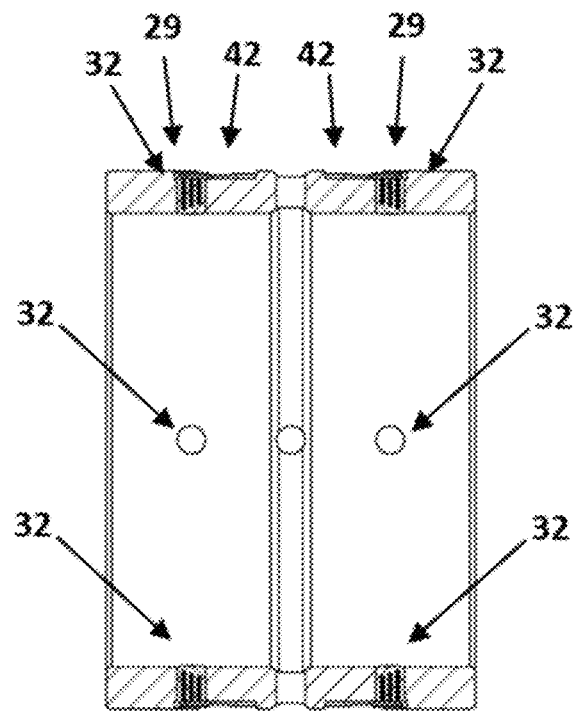
FIG. 6 is a section similar to FIG. 4, showing a variation of the guide device with sensors on both sides.

FIG. 6 shows a variation of the guide device (10), comprising sensors (32) disposed on the two longitudinal sides (29), but not in the central portion. The device (10) may advantageously be mounted in two directions, without the operator being forced to pay attention to its orientation. This configuration is also useful in the event of asymmetry in the distribution of mechanical stresses between the two sides (29). Preferably, the communication system (40) comprises two transmitters (42), one on each side. This facilitates the connection between the sensor (32) and the emitters (42), and ensures that an emitter (42) is always close to the external reader disposed in the vicinity of the device (10).

Furthermore, the device (10) may have a different conformation to that of FIGS. 1 to 6 without departing from the scope of the invention which is defined in the claims. Furthermore, the technical characteristics of the various embodiments and variants mentioned above can be combined in their entirety or only in part. Thus, the device (10) can be adapted in terms of cost, functions and performance.

The invention claimed is:

1. A guide device comprising:
   a metal component in the form of a bush provided with a friction surface intended to receive a mating part in frictional contact by sliding with oscillation;
   a sensing system of the wear of the friction surface comprising one or more sensors;
   a wireless communication system connected to the sensing system and configured to transmit information relating to wear of the friction surface out of the guide device;
   characterized in that the sensor or sensors are disposed exclusively on one longitudinal side or on two longitudinal sides of the bush, each longitudinal side being defined over at most two fifths of the length of the annular bush.

2. The guide device according to claim 1, characterized in that each longitudinal side is defined over a third of the length of the annular bush.

3. The guide device according to claim 1, characterized in that the or each sensor comprises at least one conductive wire having one end arranged at a given depth under the friction surface.

4. The guide device according to claim 1, characterized in that the sensing system is configured to detect different wear thresholds of the friction surface.

5. The guide device according to claim 4, characterized in that the or each sensor comprises a plurality of conductive wires having ends disposed at different depths below the friction surface.

6. The guide device according to claim 1, characterised in that the or each sensor comprises a cylindrical envelope housed in an orifice passing through the metal component between the friction surface and an opposite surface.

7. The guide device according to claim 1, characterized in that the sensing system comprises four sensors distributed at 90° about the central axis of the metal component.

8. The guide device according to claim 1, characterized in that the metal component has a total thickness greater than 10 millimetres, and the wireless communication system comprises a transmitter configured to transmit information through said metal component.

9. A mechanical system, comprising at least one guide device as claimed in claim 1, and a mating part mounted in frictional contact by sliding with oscillation against the friction surface.

10. A guide device comprising:
    a metal component in the form of a bush provided with a friction surface intended to receive a mating part in frictional contact by sliding with oscillation;
    a sensing system of the wear of the friction surface comprising one or more sensors;
    a wireless communication system connected to the sensing system and configured to transmit information relating to wear of the friction surface out of the guide device;
    characterized in that the sensor or sensors are disposed exclusively on one longitudinal side or on two longitudinal sides of the bush, each longitudinal side being defined over at most two fifths of the length of the annular bush, and the sensing system comprises a conductive strip which is disposed in an annular groove formed on a surface of the metal component opposite to the friction surface and which is connected to each sensor and, to the wireless communication system.

11. The guide device according to claim 10, characterized in that each longitudinal side is defined over a third of the length of the annular bush.

12. The guide device according to claim 10, characterized in that the or each sensor comprises at least one conductive wire having one end arranged at a given depth under the friction surface.

13. The guide device according to claim 10, characterized in that the sensing system is configured to detect different wear thresholds of the friction surface.

14. The guide device according to claim 13, characterized in that the or each sensor comprises a plurality of conductive wires having ends disposed at different depths below the friction surface.

15. The guide device according to claim 10, characterised in that the or each sensor comprises a cylindrical envelope housed in an orifice passing through the metal component between the friction surface and an opposite surface.

16. The guide device according to claim 1, characterized in that the sensing system comprises four sensors distributed at 90° about the central axis of the metal component.

17. The guide device according to claim 1, characterized in that the metal component has a total thickness greater than 10 millimetres, and the wireless communication system comprises a transmitter configured to transmit information through said metal component.

18. A mechanical system, comprising at least one guide device as claimed in claim 10, and a mating part mounted in frictional contact by sliding with oscillation against the friction surface.

* * * * *